Sept. 29, 1959  E. M. TUCKER, SR  2,906,358
MULTIPLE-WHEEL VEHICLE
Filed Jan. 7, 1957  4 Sheets-Sheet 1
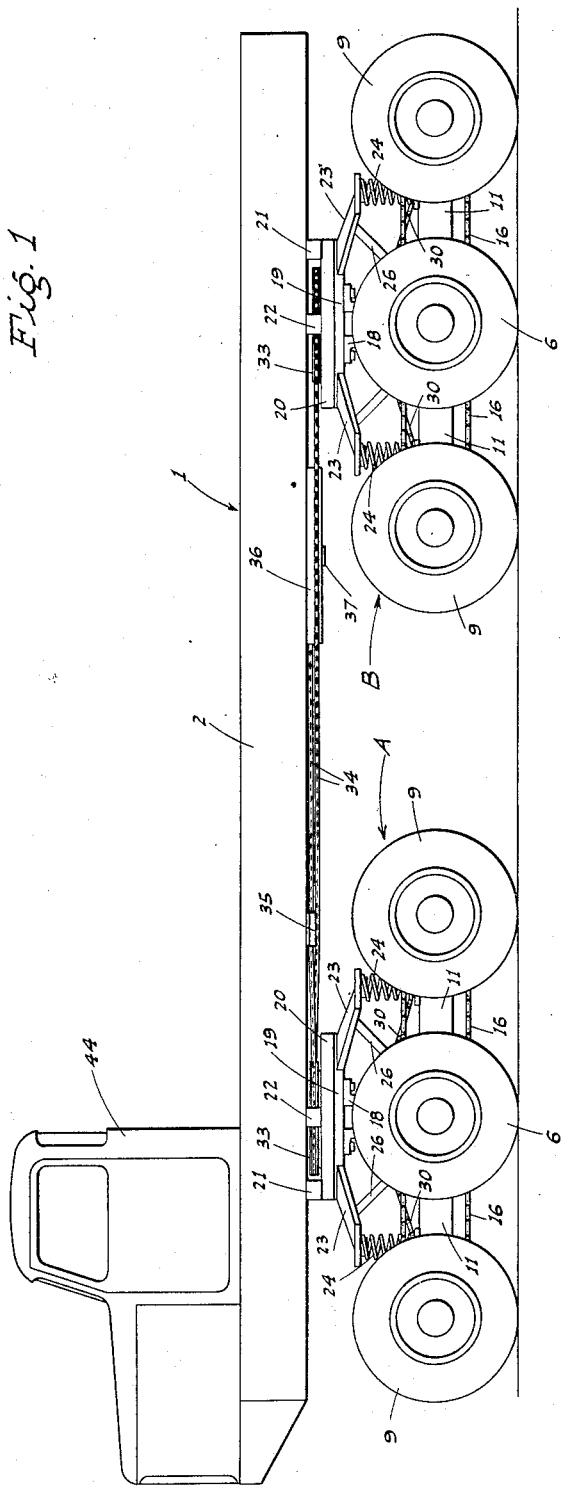
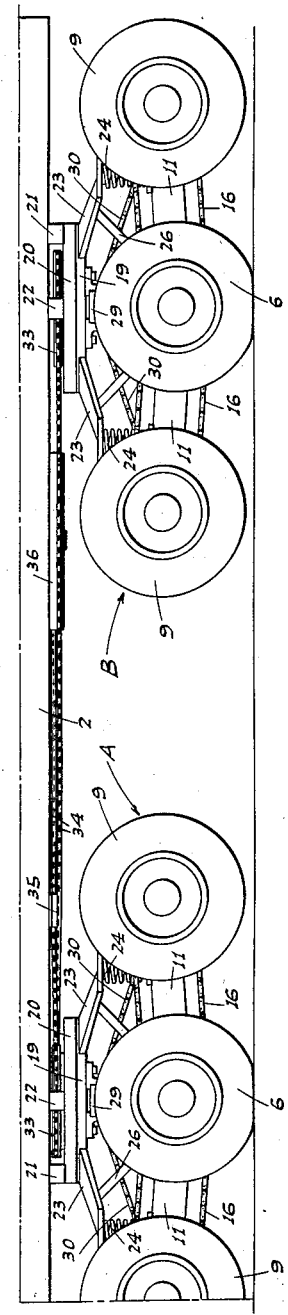
INVENTOR.
E. M. Tucker Sr.
BY
Webster & Webster
ATTYS

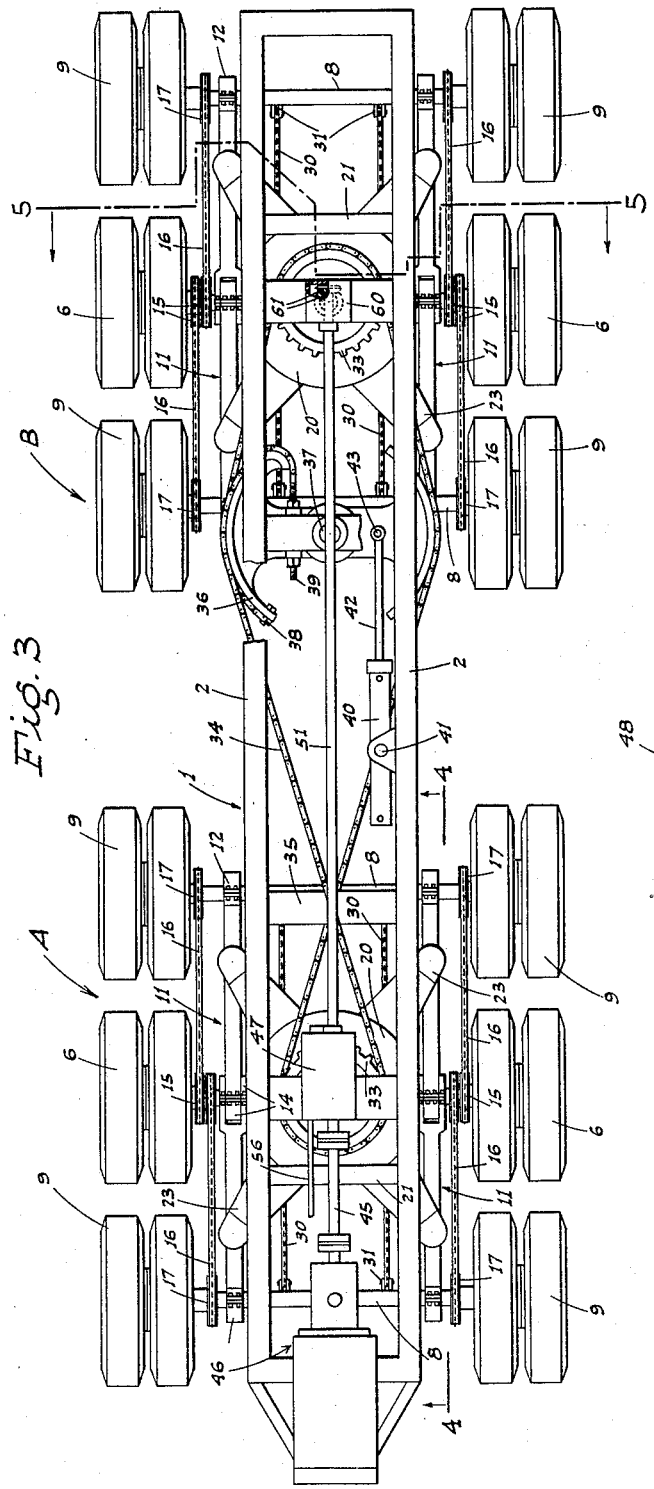

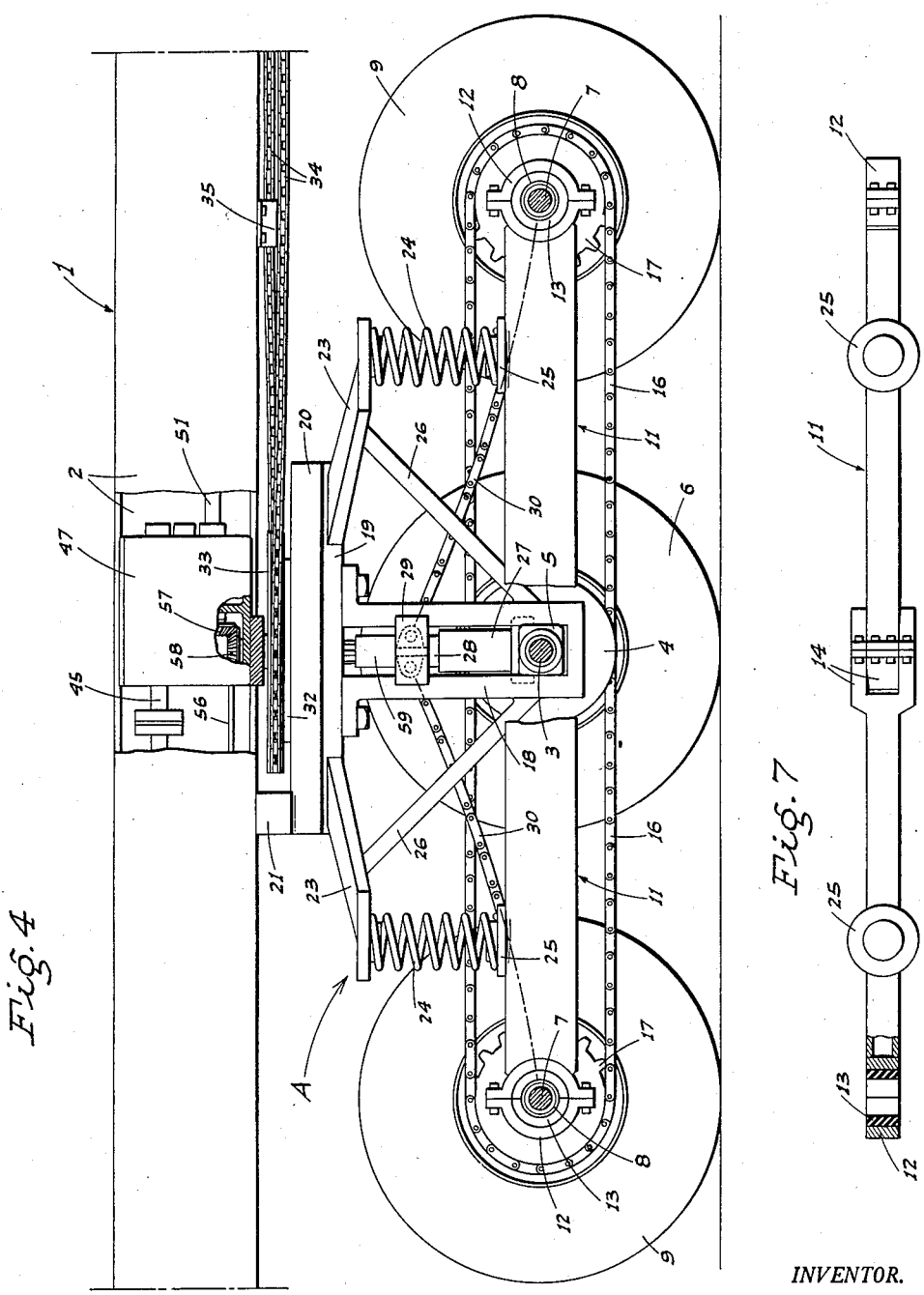

United States Patent Office 2,906,358
Patented Sept. 29, 1959

2,906,358
MULTIPLE-WHEEL VEHICLE

Emmitt M. Tucker, Sr., Medford, Oreg., assignor to Tucker & Sons, Grass Valley, Calif., a corporation of California Application January 7, 1957, Serial No. 632,816

8 Claims. (Cl. 180—23)

This invention relates to motor vehicles, and particularly to a heavy-duty truck having twelve or twenty-four wheels, depending on whether single or dual wheel tires are used.

One of the objects of this invention is to provide a vehicle of the above designated type having a frame which is supported on two swivel and steerable trucks each having six (or twelve) wheels, and all of which are driven from a single engine mounted on the frame.

Another object of the invention is to provide means for steering or turning both trucks simultaneously and in opposite directions, so that the vehicle—even though of considerable length—can negotiate sharp corners and short turns with ease. The steering means is arranged so that the trucks may be turned 90 degrees to either side of a normal straight-ahead position, so that the vehicle may be moved laterally or sideways, either to the right or left, as may be desired in certain cases.

A further important object of the invention is to provide means, operable at will by the driver of the vehicle, to lift the front and rear wheels of the three-axle trucks from the ground, particularly when making sharp turns, as when the trucks are swung to their maximum 90 degrees away from the normal straight-ahead position.

This lifting of the wheels will prevent the abrasion and burning of the front and rear tires of the trucks, such as would otherwise occur with the lateral drag of the tires across the ground or pavement as the trucks are swung. The load on the steering mechanism is also reduced when said wheels are thus lifted, since ground friction is then reduced.

It is also an object of the invention to provide a practical, reliable, and durable multiple-wheel vehicle, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the multiple-wheel vehicle, showing all the wheels in their normal lowered or ground-engaging position.

Fig. 2 is a similar view, but with the upper portion cut away, and showing the front and rear end wheels of the trucks raised from the ground.

Fig. 3 is a top plan view of the vehicle, but with the body or cab, and the controls therein, removed.

Fig. 4 is an enlarged side view of the front wheel truck, with the near wheels and drive chains removed, as on line 4—4 of Fig. 3, and otherwise partly broken away and in section.

Fig. 6 is a sectional elevation of the drive and reversing gear unit for the front wheel truck, detached.

Fig. 7 is a plan view of an articulated tie-bar unit, detached.

Figure 5:
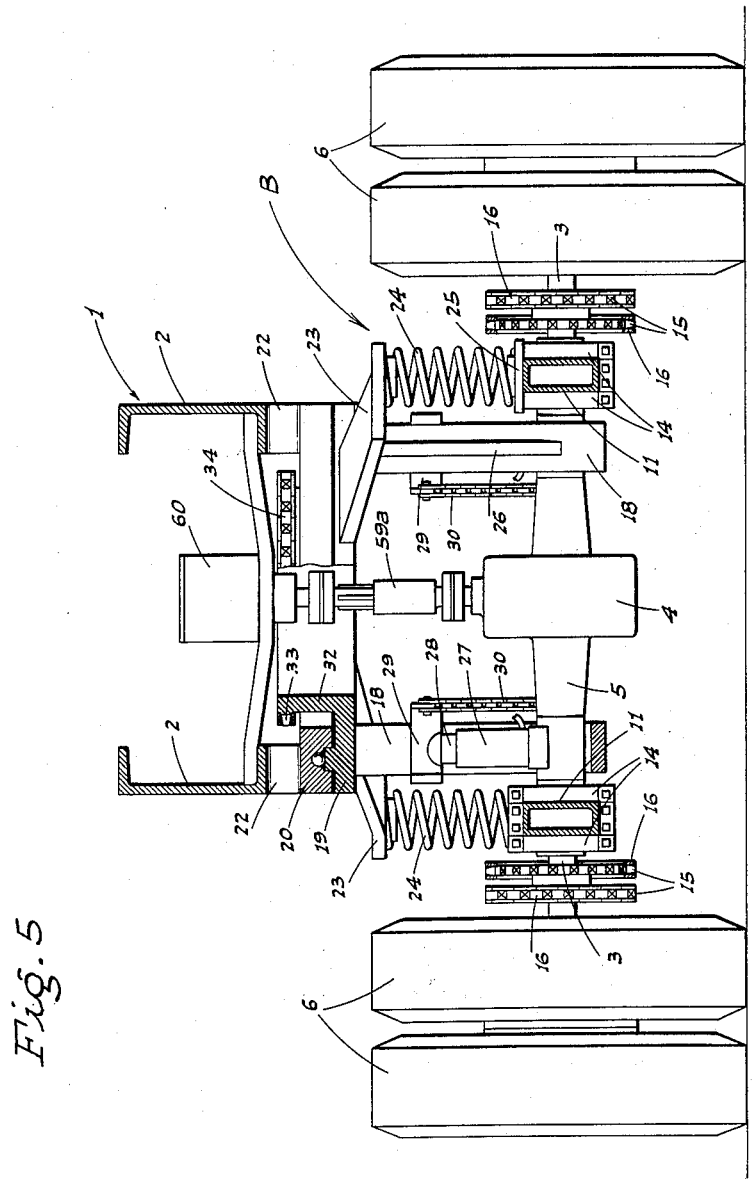
Fig. 5 is an enlarged transverse section taken substantially on line 5—5 of Fig. 3.

Referring now more particularly to the drawings, and to the characters of reference marked thereon, the vehicle comprises an elongated main frame, indicated generally at 1, which includes spaced side beams 2.

The frame is supported by front and rear multiple-wheel swivel trucks A and B, and since each truck is a duplicate of the other, a full description of one will suffice for both.

Each such truck comprises a central axle unit 3 which includes a central conventional differential enclosed, as usual, in an enlarged portion 4 of the axle housing 5. The axle unit, at its ends, supports wheels 6, here shown as being of the dual-tire type. The truck also includes front and rear axles 7, mainly enclosed in housings 8, and on the outer ends of which axles wheels 9—also preferably of the dual-tire type—are mounted.

The central and end housings 5 and 8, respectively, are connected together at their outer ends and maintained in spaced relation by laterally rigid tie bar units 11. Each such unit includes end collars 12 lined with rubber bushings 13 which are rigidly clamped about housings 8, and central overlapping collars 14 together engaging the central housing 5 in turnable relation; the unit 11 thus being arranged for vertical articulation, so that the end wheels 9 may be raised relative to the central wheels 6 from a normal ground engaging position.

Sprockets 15, rigid both with the central axle unit 3 and with the adjacent wheels 6, are mounted between said wheels and the housing 5, and are separately connected by forwardly and rearwardly projecting chains 16, with alined sprockets 17 fixed in driving connection with the front and rear wheels 9.

The central axle housing 5 adjacent its ends is vertically slidable in rigid guide members 18 which depend from, and are rigid with, opposite sides of a turntable or fifth wheel 19 which is mounted in free-turning connection with a supporting ring 20 secured on and under the frame beams 2 by suitable means, such as an end cross bar 21 and side blocks 22.

Radial arms 23 project forwardly and rearwardly from turntable 19, and at their ends overlie the tie bar units 11 intermediate the central and end wheels. Helical compression springs 24 extend between and engage the arms 23 and pads 25 secured on the tie bar units 11. Diagonal braces 26 extend between the guide member 18 and arms 23 in stiffening relation.

When rotation is imparted to each turntable in the manner hereinafter described, such rotation will be imparted to the central housing 3 to swing the same horizontally. Such swinging will be imparted to the front and rear housings 8, to correspondingly swing the same, by reason of the connecting tie bar units 11.

The end wheels 9 of the truck are arranged to be lifted clear of the ground a short distance and against resistance of the springs 24 by the following means:

Supported by, and upstanding from, the central axle housing 5 adjacent and inwardly of the guides 18 are hydraulic cylinders 27 whose pistons 28 support heads 29 slidably engaging said guides 18. At their laterally inner ends the heads 29 are connected to flexible pull elements 30 which extend at a downward angle from the heads to connections with ears 31 on the front and rear axle housing 8 (see Fig. 3). The elements 30 preferably comprise chains rather than cables, since chains provide for an easier adjustment of the operative length of the elements 30 at the ears than would be the case with cables, should any such adjustment be necessary.

Normally, the pistons 28 are at the bottom of their stroke, and the chains 30 are somewhat slack, as shown in Fig. 4, so as to permit of normal relative movement of the various wheels as they pass over ground undulations. Upon fluid pressure being fed to the cylinders below the pistons, the latter are raised together with the heads 29. This of course places the chains 30 under tension, causing the axle housings 8, and the axles and wheels supported thereby, to be raised; the corresponding portions of the tie bar units 11 swinging about the central axle housing 5 as an axis.

The resulting position of the wheels of the trucks is shown in Fig. 2; the vehicle being then supported by the central wheels 6 only. This facilitates steering of the trucks, and prevents the heavy abrasion and possible burning of the rubber of the tires of the end wheels which would otherwise occur when sharp turns are being made.

Simultaneous turning or steering of the trucks in opposite directions is effected as follows:

Each turntable 19 is formed with a tubular portion 32 which projects upwardly through ring 20 and which carries a sprocket 33 on its upper end. A continuous and in effect endless chain 34 extends between and engages about the sprockets of both turntables; the opposed runs of the chain crossing each other intermediate the sprockets, as shown in Fig. 3. At their zone of crossing the runs of the chain are maintained separated by a transverse wear plate 35 supported by frame 1.

A relatively narrow rotary drum 36 is pivotally mounted on the frame 1 on a vertical axis, as at 37, centrally between the beams 2 on a level with the sprockets 33, and in a longitudinal position on the frame between the point of crossing of the chain and one of the sprockets 33.

One end of the chain is secured on the drum, as shown at 38, and extends thence about the adjacent side of the drum to and about said one sprocket 33. The chain then extends to and about the other side of the drum in engagement therewith, and then extends to the opposite side of the other sprocket 33. The chain then passes about said other sprocket and back to the same side of the drum to which the chain is initially secured. The chain then passes about said side of the drum in vertically overlapping relation to the initial end portion of the chain, and terminates at—and is connected to—an adjustable anchor bolt 39 mounted on the drum, and by means of which the tension of the chain may be adjusted. This arrangement and mounting of the chain is shown in Fig. 3.

The diameter of the drum relative to the sprockets 33 is such that the sprockets may be turned through an arc of 180 degrees (90 degrees each way from a starting position or when the wheels of the trucks are in straight alinement with the frame) with a relatively small arcuate rotation of the drum. Such rotation is imparted to the drum by a two-way hydraulic cylinder unit 40, the cylinder of which is swively mounted on one of the frame beams 2, as at 41, while the piston rod 42 on said unit is pivotally connected, as at 43, to the web of the drum radially out from the pivot 37 of said drum.

The operation of the cylinder unit 40 is controlled by the driver in the cab 44 of the vehicle; the cylinder unit 40, as well as the wheel-lift control cylinders 27, being of course connected to a conventional form of fluid pressure system mounted on the vehicle and driven by the engine thereof, as is common practice. The vehicle may thus be readily steered and turned in a relatively short arc, and—if desired—both trucks may be turned through an arc of 90 degrees away from their normal position; thus disposing the trucks in parallel relation to each other, and enabling the vehicle to be moved in a direction laterally of the length of the frame.

The wheel base of each truck is of greater length than the width of the body or frame of the vehicle, so that when the trucks are swung to a laterally facing position, the stability of the vehicle is maintained, and there is no tendency for the same to tip over.

The trucks are driven from the propeller shaft 45 of the power plant 46 of the vehicle by the following arrangement:

Mounted on the frame 1 directly above the forward turntable 19 is a gear box 47. Shaft 45 projects into said box, and longitudinally spaced gears 48 and 49 are secured on said shaft within the box. Gear 48 normally meshes with a shiftable gear 50 slidably splined on a stub shaft 50a journaled in the gear box parallel to and below shaft 45 and alined with a rearwardly projecting shaft 51. Gear 49 is connected in driving relation with a gear 52 fixed on shaft 51 by means of an intermediate gear 53 journaled in the gear box; gear 52 and shaft 51 thus turning in the same direction as gear 49 and shaft 45, while gear 50—when meshed with gear 48—will be turned in the opposite direction to said shaft 45.

Gear 52 is formed with a smaller gear 53 facing the gear 50, while said gear 50 is formed with an internal gear 54 to engage gear 53 in driving relation and normally spaced therefrom. Gear 50 is connected to a shifting fork 55 actuated by a forwardly projecting rod 56 which extends to a suitable control device (not shown) within the cab 44.

The forward end of shaft 50a is connected to a bevel gear 57 which meshes with a similar gear 58, both said gears being within the gear box 47.

The above described gearing arrangement is fully shown in Fig. 6.

Gear 58 is connected to a depending shaft unit 59 disposed coaxially with the turntable 19, and which shaft unit enters the differential housing 4 of the central axle 3 of the front wheel truck A, and is there connected to the differential unit in said housing in the conventional manner.

The shaft 51 extends rearwardly from box 47 and at its rear end terminates within a gear box 60 mounted on the frame 1 over the turntable 19 of the rear truck B. A bevel gear unit 61, driven by shaft 51 (see Fig. 3) is mounted within the housing 60; the shaft unit 59a depending from said gear unit engaging the differential mechanism within the housing 4 to drive the rear central axle 3.

By means of the above described arrangement, it will be seen that when the gear 54 is engaged with gear 53, the shaft 50a will be driven, and such drive will be imparted to the wheels of both trucks in the same direction. When the gear 50 is shifted forwardly to a position such that said gear 50 is still clear of gear 48 while the internal gear 54 is clear of gear 53, no drive will be imparted to shaft 50a or to the wheel truck A. When gear 50 is further shifted so that it meshes with gear 48, as shown in Fig. 6, shaft 50a (and the wheel truck A) will be driven in the opposite direction.

Since the depending shaft units 59 and 59a are coaxial with the corresponding turntables, turning or steering of the trucks does not interfere with the driving thereof.

By means of this gear arrangement, if the trucks are first turned to a right angle position relative to the truck body or frame, the driving of the trucks may be temporarily reversed relative to each other to cause the vehicle frame to be disposed at any desired angle to the normal line of travel.

Both trucks may then be driven in a common direction to move the vehicle laterally while maintaining its angular relation to said normal line of travel, as is desired under certain conditions of operation, as when using an angle snow plow.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A multiple-wheel vehicle comprising a frame, a pair of longitudinally spaced swivelly mounted wheel trucks supporting the frame from the ground, each truck comprising a central axle unit, front and rear axles between which the central axle unit is disposed, wheels mounted on all said axles, means on the vehicle to turn both trucks simultaneously about vertical axes intersecting the central axle unit, and means on the truck and operable at will to lift the front and rear wheels of the truck from the ground.

2. A multiple-wheel vehicle comprising a frame, a pair of longitudinally spaced swivelly mounted wheel trucks supporting the frame from the ground, each truck comprising a central axle unit, front and rear axles between which the central axle unit is disposed, wheels mounted on all said axles, housings on the axles, tie bar units connecting the housings and arranged for vertical articulation about the central housing as an axis, means on the vehicle to turn both trucks simultaneously about vertical axes intersecting the central axle units, and means connected between the central housing and the front and rear housings and operable at will to lift said front and rear housings whereby to lift the corresponding wheels from the ground.

3. A vehicle, as in claim 2, in which the last named means comprises transversely spaced upstanding hydraulic cylinders mounted on the central housing, piston elements projecting from the upper end of the cylinders, heads on the upper end of the piston elements, and flexible elements extending between and connected to said heads and the front and rear housings.

4. In a multiple-wheel vehicle which includes a frame, and a pair of longitudinally spaced trucks supporting the frame from the ground; each truck comprising a central axle housing, front and rear axle housings between which the central housing is disposed, wheels at the outer end of the housings, tie bar units connected to the front and rear housings and extending thence to the central housing, means turnably mounting said units on the central housing for vertical articulation about the central housing as an axis, a fifth wheel turnably supported from the frame with its axis in the vertical plane of the central axle housing, transversely spaced members rigid with and depending from the fifth wheel, means connecting the members and central housing in vertically slidable relation so that the housing turns as a unit with the fifth wheel, and compression springs between the fifth wheel and the tie bar units and engaging the latter at points between the central housing and the front and rear housings.

5. A multiple-wheel vehicle comprising a frame, a pair of longitudinally spaced wheel trucks under the frame, fifth wheels connecting the frame and trucks and each including a member turnable with the related truck as a unit, sprockets mounted axially with and above the members, a continuous chain extending between and engaging about the sprockets, the chain having opposed runs crossing each other intermediate their ends, a vertical-axis drum mounted on the frame between the point of crossing of the chain runs and one of the sprockets and whose periphery is engaged on opposite sides by the opposed runs of the chain, means securing one run of the chain on the related side of the drum, and means on the vehicle to rotate the drum.

6. A structure, as in claim 5, in which the radius of the drum is materially greater than that of the sprockets.

7. A multiple-wheel vehicle comprising a frame, a pair of longitudinally spaced swivelly mounted wheel trucks supporting the frame from the ground, means on the vehicle and applied to the trucks to turn the same simultaneously about vertical axes and to an extent sufficient to dispose the trucks at a predetermined angle to the frame, means on the vehicle operatively connected to the trucks to drive the same, and including a drive shaft, a driven shaft operatively connected to one of the trucks in driving relation, gearing connecting the shafts to drive the same in a common direction and including a first gear fixed on the driven shaft, another driven shaft alined with the first named driven shaft and operatively connected to the other truck in driving relation, a second gear fixed on the drive shaft, a third gear shiftably splined on the last named driven shaft to engage the second gear and cooperating elements on the first and third gears engaged in driving relation when the third gear is shifted along the last named driven shaft and is disengaged from the second gear.

8. A mechanism, as in claim 7, in which the first gear is spaced lengthwise from the second gear a sufficient distance to allow the third gear to be shifted out of engagement with the second gear before said elements engage each other whereby to then disengage the last named driven shaft from any connection with the drive shaft.

References Cited in the file of this patent

UNITED STATES PATENTS

| 1,126,551 | Morton | Jan. 26, 1915 |
| 1,275,580 | McLaren | Aug. 13, 1918 |
| 1,278,658 | Hotchkiss | Sept. 10, 1918 |
| 1,321,612 | Flavin | Nov. 11, 1919 |
| 1,402,175 | Overman | Jan. 3, 1922 |
| 1,539,936 | Clark | June 2, 1925 |
| 1,699,877 | Clark | Jan. 22, 1929 |
| 2,161,907 | Barr | June 13, 1939 |
| 2,426,342 | Couse | Aug. 26, 1947 |

FOREIGN PATENTS

| 537,619 | Great Britain | June 30, 1941 |
| 656,586 | Great Britain | Aug. 29, 1951 |